May 31, 1932. S. W. BORDEN 1,860,802
CONDUIT BONDING FITTING
Filed March 1, 1930
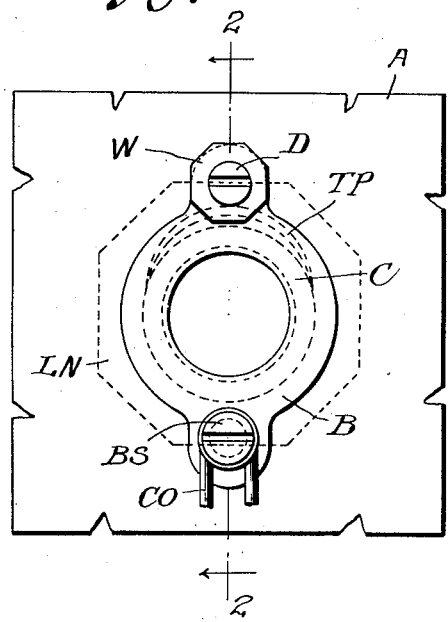
Fig. 1.
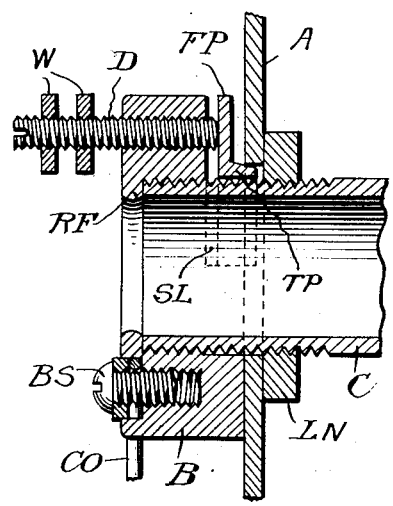
Fig. 2.
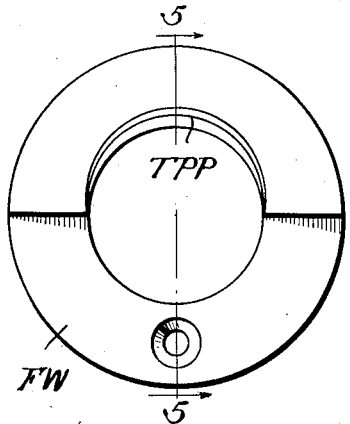
Fig. 4.
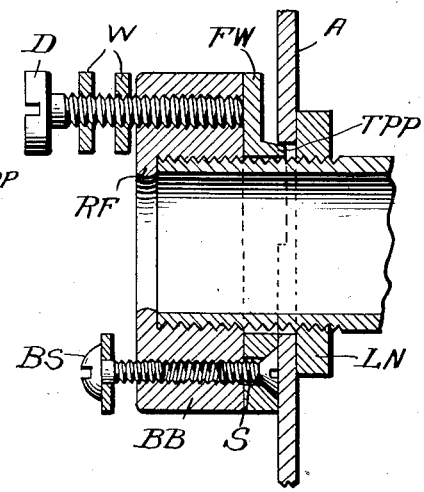
Fig. 3.
Fig. 5.
Inventor:
Stephen W. Borden Patented May 31, 1932

1,860,802

UNITED STATES PATENT OFFICE

STEPHEN W. BORDEN, OF SUMMIT, NEW JERSEY

CONDUIT BONDING FITTING

Application filed March 1, 1930. Serial No. 432,571.

This application is a continuation in part of my co-pending application Serial No. 356,275, filed April 18th, 1929.

This invention pertains to improvements in electrical bonding fittings, used principally for the purpose of establishing an electrical connection between conduits and metallic wiring boxes to which the conduits are attached.

The object of my invention is to provide a fitting for use on the end of a conduit which protrudes into a box and which, when applied thereto as intended, will result in establishing an adequate electrical circuit between the conduit and the box and one in which the contacting members are securely fastened against loosening due to subsequent vibration of the parts. A further object is to provide a fitting which will be relatively economical to use.

In the accompanying drawings like symbols refer to like parts and Fig. 3 of the drawings discloses what I consider to be the preferred form of my fitting, but it is understood that minor changes and substitutions in this design are possible without materially effecting the usefulness of the fitting. In the drawings, Fig. 1 is a front elevation of a fitting B installed on the end of a conduit C the fitting having a tapered portion TP integral with the body of the fitting. Fig. 2 is a vertical cross-section taken on the line 2—2 of Fig. 1.

Fig. 3 is a vertical cross-section of a modified fitting in which a flanged washer, FW, is employed. Fig. 4 is a front elevation of the flanged washer FW of Fig. 3 and Fig. 5 is a vertical cross-section of the same taken on line 5—5 of Fig. 4.

Referring to Figures 1 and 2, a conduit C enters through the box wall A, the conduit being provided with a locknut LN on the outside of the box. The fitting is screw-threaded for the conduit and is formed with a tapered portion TP and a transverse slot SL. The tapered portion TP extends approximately half-way around the conduit, growing thinner as it approaches the center, but this particular construction is not essential and the portion may extend around the entire circumference of the conduit but the construction shown is preferable because the clearance between the conduit and the box wall is usually so small that the tapered portion TP has to be very thin if it extends all the way around the conduit, whereas when constructed as shown its maximum thickness may be much greater thus facilitating manufacturing.

Fitting B is screwed on the inside of the box at least a sufficient number of turns so that there is no danger of its conduit threads being stripped when pressure is applied to the fitting by tightening the threaded member D. The threaded member D, being forced rigidly against the flanged portion FP forces the tapered portion TP into the clearance space between the conduit C and the box wall A. The body of the fitting B is formed with a screw-threaded hole for the threaded member D and this member may be provided with means, such as nuts W, for attaching an electrical conductor to the member D or for fastening a conductor to fitting B as by clamping it between one of the nuts and the fitting.

When the threaded member D is screwed up tight and the tapered portion TP forced into the clearance space between the conduit and the box wall a good electrical contact is established with the box wall which contact is independent of the face of the wall and therefore independent of any paint or enamel with which the face of the wall may be provided, this being partly due to the fact that the hole through which the conduit enters the box is not made until after the box has been enameled and partly to the cutting and scraping action of the sharp edges of the box wall against the tapered member TP as it is forced into the clearance space between the conduit and the wall.

It is obvious that when D is set-up tight the entire fitting is securely locked against loosening on the conduit. The threaded member D, therefore, performs several functions, to wit: it locks the fitting against loosening on the conduit, it forces the tapered portion TP into good electrical contact with the box wall independently of the face of the wall and it provides a means of connecting an electrical conductor to the fitting.

It is not always convenient to attach an electrical conductor to the member D because of lack of working space and it is also sometimes convenient to have two points of attachment for electrical conductors, and I therefore provide the binding screw BS as an independent means of attaching a conductor such as CO. As many threaded screw holes for the members D and BS as may be desired may be provided in the annular portion of the fitting and a fitting provided with three or four such holes, with equal angular spacing, considerably facilitates the attachment of conductors thereto.

In Fig. 3 the flanged washer FW is a separate article from the rest of the fitting BB, but it may be attached thereto as by the screw S or other means. The installation and functioning of the fitting is substantially the same as that of Fig. 2 except that in this case the threaded member D performs the additional function, (when screw S or its equivalent is not used), of establishing a good electrical connection between the portions BB and FW, these parts not being integrally connected as in the fitting of Fig. 2. The screw S holds the parts in correct relative position so that the portion TPP is always opposite the screw D and it also improves the electrical circuit between BB and FW.

The reason for making the fitting in two parts is that the part BB is most economically constructed by casting while the part FW is most economically constructed by punching and forming from sheet metal.

Figures 4 and 5 are a front elevation and a vertical cross-section respectively of the flanged washer FW of Fig. 3 and these figures show also the general form of the part TP of Fig. 2.

I have shown a fitting provided with a rounded flanged portion, RF of Figure 2, overlapping the end of the conduit thus making the fitting itself suitable as a "conduit bushing" and while this adds greatly to the usefulness of the fitting it nevertheless is not an essential element in the bonding of the conduit to the box wall.

While it is desirable to attach the part FW to the part BB this is not essential, the object being primarily to facilitate installation.

What I claim is:—

1. A conduit bushing formed with a threaded conduit receiving opening and with a threaded screw hole and including a second portion consisting of an annular washer formed with an integral tapered member extending parallel to the conduit opening and a threaded member in the screw hole, the threaded member projecting therefrom and against the annular washer.

2. A conduit bushing formed with a threaded conduit receiving opening and with a threaded screw hole and including a second portion consisting of an annular washer formed with an integral tapered member extending parallel to the conduit opening and a threaded member in the screw hole, the threaded member projecting therefrom and against the annular washer, said bushing having means for attaching an electrical conductor thereto.

3. A conduit bushing formed with a threaded conduit receiving opening and with a threaded screw hole and including a second portion consisting of an annular washer formed with an integral tapered member extending parallel to the conduit opening and a threaded screw in the screw hole, the threaded screw projecting therefrom and against the annular washer, said screw having means for attaching an electrical conductor thereto.

4. A conduit bushing formed with a threaded conduit receiving opening and with a threaded screw hole and including a second portion attached to the first portion and consisting of an annular washer formed with an integral tapered member extending parallel to the conduit opening and a threaded member in the screw hole, the threaded member projecting therefrom and against the annular washer.

5. A conduit bushing formed with a threaded conduit receiving opening and with a threaded screw hole and including a second portion attached to the first portion and consisting of an annular washer formed with an integral tapered member extending parallel to the conduit opening and a threaded member in the screw hole, the threaded member projecting therefrom and against the annular washer, said bushing having means for attaching an electrical conductor thereto.

6. A conduit bushing formed with a threaded conduit receiving opening and with a threaded screw hole and including a second portion attached to the first portion and consisting of an annular washer formed with an integral tapered member extending parallel to the conduit opening and a threaded screw in the screw hole, the threaded screw projecting therefrom and against the annular washer, said screw having means for attaching an electrical conductor thereto.

7. The combination of a threaded conduit receiving bushing for the end of a threaded conduit which extends through an opening in a wall of a metal box, said bushing having a threaded screw hole and a threaded screw in the hole with an annular washer formed with an integral tapered member extending parallel to the conduit, the threaded member projecting against the washer and forcing the tapered member into the opening between said conduit and the box wall.

8. The combination of a threaded conduit receiving bushing for the end of a threaded conduit which extends through an opening in a wall of a metal box, said bushing having a threaded screw hole and a threaded screw in the hole with an annular washer formed with an integral tapered member extending parallel to the conduit, the threaded member projecting against the washer and forcing the tapered member into the opening between said conduit and the box wall, said bushing having means for attaching an electrical conductor thereto.

9. The combination of a threaded conduit receiving bushing for the end of a threaded conduit which extends through an opening in a wall of a metal box, said bushing having a threaded screw hole and a threaded screw in the hole with an annular washer formed with an integral tapered member extending parallel to the conduit, the threaded screw projecting against the washer and forcing the tapered member into the opening between said conduit and the box wall, said screw having means for attaching an electrical conductor thereto.

In testimony whereof I have affixed my signature.

STEPHEN W. BORDEN.